United States Patent [19]

Neufeld

[11] Patent Number: 4,768,731
[45] Date of Patent: Sep. 6, 1988

[54] FISHING REEL WITH LINE CONTROL DEVICE

[75] Inventor: Henry L. Neufeld, Tulsa, Okla.

[73] Assignee: Brunswick Corporation, Skokie, Ill.

[21] Appl. No.: 52,206

[22] Filed: May 18, 1987

Related U.S. Application Data

[63] Continuation of Ser. No. 792,262, Oct. 28, 1985, abandoned.

[51] Int. Cl.[4] .................. A01K 89/01; A01K 89/02
[52] U.S. Cl. .................... 242/84.2 A; 242/84.5 A
[58] Field of Search .............. 242/84.2 A, 84.21 A, 242/84.51 A, 84.5 A, 84.2 R, 84.5 R, 84.51 R

[56] References Cited

U.S. PATENT DOCUMENTS

| | | | |
|---|---|---|---|
| 2,884,211 | 4/1959 | Holahan, Jr. ................. | 242/84.1 K |
| 2,903,201 | 9/1959 | Sarah . | |
| 3,254,861 | 6/1966 | Jahn ............................ | 242/84.21 R |
| 3,329,371 | 7/1967 | Willis . | |
| 3,697,011 | 10/1972 | Christensen et al. ......... | 242/84.2 A |
| 4,156,510 | 5/1979 | Hull . | |
| 4,222,534 | 9/1980 | Ishida ........................... | 242/84.2 R |
| 4,323,203 | 4/1982 | Neufeld ........................ | 242/84.2 A |
| 4,451,012 | 5/1984 | Puryear et al. . | |

FOREIGN PATENT DOCUMENTS 1257751 12/1971 United Kingdom .......... 242/84.2 R Primary Examiner—Stanley N. Gilreath
Attorney, Agent, or Firm—Wood, Dalton, Phillips, Mason & Rowe

[57] ABSTRACT

An anti-tangle device is disclosed for use in a fishing reel which includes a hub, a spool carried by the hub for maintaining a supply of fishing line, and the spool having a radially extending front wall terminating in an outer rim. A center shaft extends axially through the hub. A spinner head is carried on the forward end of the center shaft and at least partially longitudinally overlaps the front wall of the spool defining an annular gap therebetween. Crank and gears are provided for rotating the center shaft and for selectively moving the shaft forwardly and rearwardly of the spool for moving the spinner head therewith. A drag washer is mounted on the hub forwardly of the front wall of the spool and includes an annular flange projecting rearwardly over the rim of the front wall. Fishing line drawn radially from the spool rides on the flange of the drag washer to prevent entanglement of the line in the gap between the spinner head and the spool washer.

2 Claims, 1 Drawing Sheet

FISHING REEL WITH LINE CONTROL DEVICE

This application is a continuation of application Ser. No. 792,262, filed 10/28/85, now abandoned.

FIELD OF THE INVENTION

This invention relates to spincast style fishing reels, and more particularly, to a device for preventing line from migrating between the spool and the spinner head.

BACKGROUND OF THE INVENTION

Spincast style fishing reels normally are of the closed-face type and sometimes have provision for level winding. A lip or edge of a spinner head, including a pick-up member such as a radially extending pin, is generally positioned during line retrieval so that the line is fed to the spool at a midpoint between the spool flanges. To permit relative rotational and axial movement between the spinner head and the forward flange of the spool, a space must necessarily be maintained therebetween. When the reel is placed in condition for casting, the spinner head is moved forwardly relative to the spool, the pin drops, and the line is free to pay out. This forward movement of the spinner head exposes the space or gap between the spool forward wall and the spinner head. The line is not tensioned and the coils of line expand and may adhere to the underside of the spinner head. The line may be drawn into the gap between the spinner head and the spool and become entangled on the center shaft of the reel which rotates the spinner head and axially moves the spinner head. When this occurs, the reel function is inhibited or completely stopped. Users of spincast reels of the character described have contended with this problem for years.

U.S. Pat. No. 4,156,510 to R. D. Hull, dated May 29, 1979, discloses a solution to the problem by providing a fine twisted wire having short fibers or bristles in the arrangement of a miniature pipe cleaner. The wire is used to cover the rim of the spool flange, with the bristles restricting the passage of the line into the gap between the spool and the spinner head. A similar approach to solving the problem is disclosed in U.S. Pat. No. 4,451,012 to J. W. Puryear, dated May 29, 1984, wherein fibers are adhered to the rim of the spool flange so that the fibers project radially outwardly to prevent the fishing line from migrating underneath the spinner head.

U.S. Pat. Nos. 2,903,201 to T. F. Sarah, dated Sept. 8, 1959, and 3,329,371 to C. E. Willis, dated July 4, 1967, show a different approach wherein the edge or forward wall of the spool is turned rearwardly to define an annular flange between the spool walls terminating generally centrally of the spool. This forces the untensioned line to ride on the flange and prevent the line from migrating into the gap between the forward wall of the spool and the spinner head. In Sarah, the rearwardly turned flange is formed by a customized spool wall. In Willis, the rearwardly turned flange is formed by separate members for securing to the rim of the spool forward wall, and securing means is necessary to maintain the rearwardly turned flange in position.

SUMMARY OF THE INVENTION

An object, therefore, of the invention is to provide a new and improved device for preventing fishing line from migrating between the spool and the spinner head of a fishing reel, such as a spincast style reel.

Another object of the invention is to provide certain reels with an anti-tangle device of the character described which anti-tangle device either can be originally assembled in the reel or assembled to the reel simply by relacing the drag washers on the reel spool with the novel anti-tangle washers.

In the exemplary embodiment of the invention, the device is designed for use with a fishing reel which includes a hub, a spool carried by the hub for maintaining a supply of fishing line, a radially extending front wall of the hub terminating in an outer rim, and a center shaft extending axially through the hub. A spinner head is carried on a forward end of the center shaft and at least partially longitudinally overlaps the front wall of the spool defining an annular gap therebetween. Means are provided for rotating the center shaft, and means are provided for selectively moving the center shaft forwardly and rearwardly relative to the spool. The invention contemplates a drag washer mounted on the hub forwardly of the front wall of the spool and including an axial flange on the washer positioned over the rim of the front wall of the spool. Therefore, the fishing line which is drawn axially from the spool rides on the flange of the drag washer to prevent entanglement of the line in the gap between the spinner head and the spool.

As disclosed herein, the drag washer is integrally formed with a flat friction wall portion engaging the front wall of the spool and an axial annular wall portion defining the anti-tangle flange positioned over the rim of the front wall of the spool. Therefore, this unitary structure performs a dual function of providing a drag on the spool as well as preventing entanglement of the line in the gap between the spinner head and the spool. A retainer clip is removably mounted on the hub for removably mounting the drag washer on the hub in axial position agaainst the front wall of the spool. In this manner, the unitary drag washer, anti-tangle device can be assembled on the hub during manufacture as an original part of the reel. In addition, certain select reels have drag washers normally positioned against the front wall of the spool which can be removed in the field and replaced by the unitary device of the invention to convert the reel to one which is provided with the anti-tangle device without any other changes to the reel.

Other objects, features and advantages of the invention will be apparent from the following detailed description taken in conjunction with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
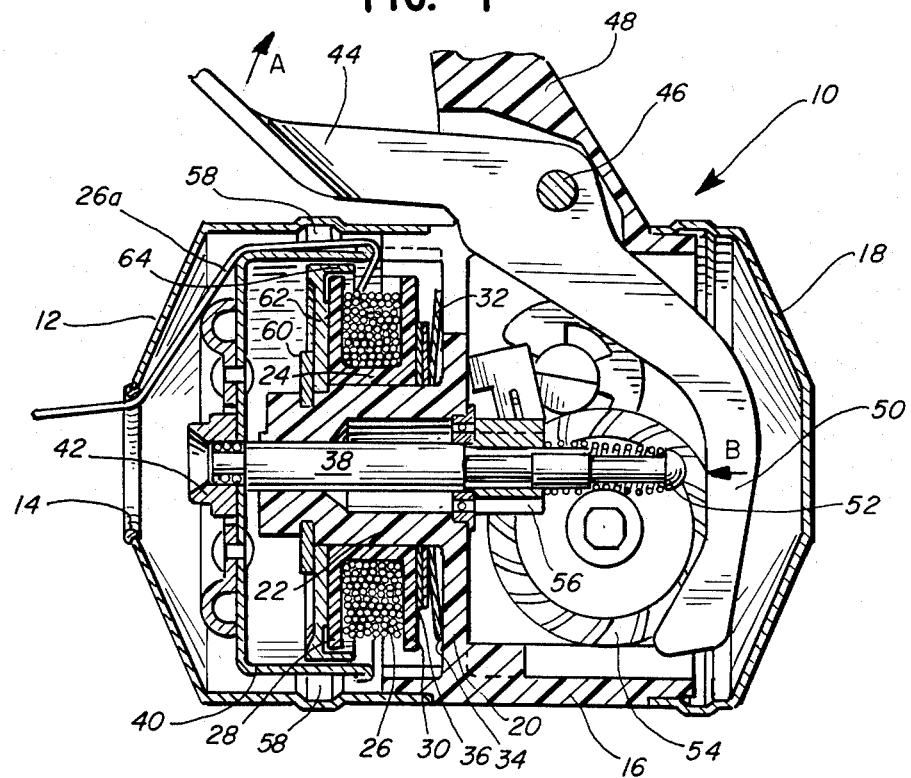
FIG. 1 is a fragmented vertical section through a spincast style fishing reel incorporating the invention.
Figure 2:
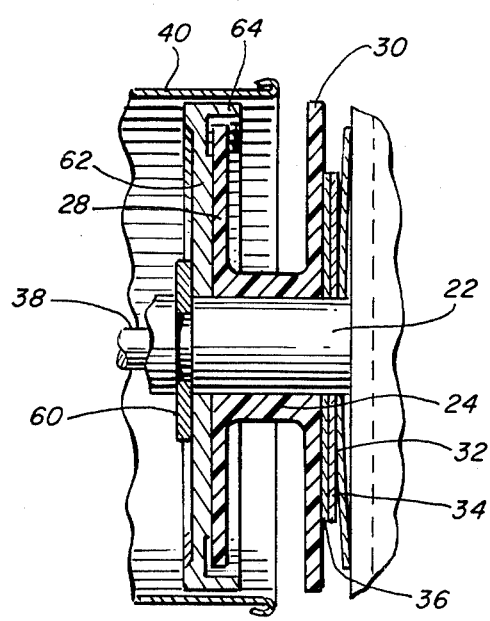
FIG. 2 is a fragmented section, on an enlarged scale, of that portion of the reel incorporating the anti-tangle drag washer of the invention.

Referring to the drawings in greater detail, FIG. 1 shows a spincast style fishing reel, generally designated 10, which is quite appropriate for use with the invention. The reel is generally conventional and includes a housing having a front cover 12 provided with a centrally located forward line guide 14, a body portion 16 and a rear cover 18. Body portion 16 defines a deck plate 20 having an integral, forwardly extending hub 22. A spool 24 is carried by hub 22 for maintaining a supply of fishing line 26. The spool is generally conventional and includes a radially extending front wall 28 terminating in a peripheral rim, and a radially extending rear wall 30. An adjustable drag plate 32 such as shown and described in Elvis W. Moss, U.S. Pat. No. 4,408,729, a back spool washer 34 and a flat back drag washer 36 are disposed between deck plate 20 and the rear wall 30 of spool 24 about hub 22. Adjusting the drag plate will adjust the amount of drag applied to the spool.

A center shaft 38 extends axially through hub 22, and a cup-shaped spinner head 40 is mounted by a nut 42 onto the forward end of center shaft 38 for axial movement with the shaft. It can be seen that the annular wall of the spinner head at least partially longitudinally overlaps front wall 28 of spool 24 defining an annular gap therebetween. The spinner head is shown in the drawings in line retrieval position so that line 26a is fed to the spool over the rear edge of the spinner head near the midpoint between the two walls 28, 30 of spool 24. This is seen best in FIG. 1.

A finger brake 44 or thumb stop is pivotally mounted, as at 46, to a stem portion 48 which normally includes a foot portion (not shown) for mounting the reel on a fishing rod. Stem 48 is formed integrally with body portion 16. Finger brake 44 or thumb stop has a lower leg portion 50 for engaging a rear distal end 52 of center shaft 38. Therefore, a user pivots finger brake 44 in the direction of arrow "A" to move leg portions 50 forwardly in the direction of arrow "B" to engage distal end 52 of center shaft 38 and move the shaft and spinner head forwardly to place the reel in condition for casting. It is during this condition that problems of entanglement of line 26a occur because the line tends to migrate into the gap between the underside of the spinner head and the forward wall 28 of the spool, ultimately becoming entangled about the forward end of center shaft 38.

During line retrieval, conventional means such as a hand crank are used to rotate a cup gear 54 meshed with a pinion gear 56 for rotating spinner head 40 which rotates line pick-up pin 58 for winding the line onto spool 24. Details of these and other components of the fishing reel can be seen in the aforesaid mentioned U.S. Pat. No. 4,451,012 which is incorporated herein by reference.

Normally, as shown in the above mentioned patent, a front drag washer and a front spool washer are positioned about hub 22 with the front spool washer keyed to the hub. The drag washer and the spool washer are maintained axially against the front wall 28 of spool 24 by a removable spool retainer clip 60. This invention contemplates the novel approach of replacing such drag and spool washers with a single drag washer 62 keyed to the hub 22 and incorporating an integral rearwardly projecting annular wall 64 defining an axially extending annular flange positioned over the rim of front wall 28 of spool 24. Therefore, it can be seen that this unitary device performs both the function of a friction drag washer against the front wall of the spool as well as an anti-tangle device for preventing the line 26a from migrating into the gap between the spinner head and the spool. This unitary, dual-function device can be incorporated in the spool originally during manufacture. On the other hand, since in certain reels, it replaces the drag washer and spool washer of conventional reels, it can be easily assembled in the field by simply replacing those washers. This readily solves the entanglement problems which a user must contend with unless provisions are made to prevent entanglement of the line in the gap between the spinner head and the spool. In essence, fishing line drawn radially from the spool rides on the flange or annular wall portion 64 of drag washer 62 during the casting mode of the reel and thereby cannot migrate into the gap between the spinner head and the front wall of the spool.

It will be understood that the invention may be embodied in other specific forms without departing from the spirit or central characteristics thereof. The present examples and embodiments, therefore, are to be considered in all respects as illustrative and not restrictive, and the invention is not limited to the details given herein.

I claim:

1. A spin cast fishing reel comprising a body portion having a deck plate, a hub projecting forward of and non-rotatably fixed to said deck plate, a front cover fastened to the body portion and enclosing said hub, said hub having a cylindrical wall portion concentrically disposed with respect to the axis of the hub, a drag washer keyed to said hub, resilient means between the deck plate and the drag washer, a spool rotatably mounted on the hub for maintaining a supply of fishing line, a radially extending rear wall of the spool operatively engaging the drag washer and a front wall of the spool terminating in an outer rim, a center shaft extending axially through the hub, a spinner head located inside the front cover and carried on a forward end of the center shaft, said spinner head having a cylindrical portion longitudinally overlapping the outer rim of the front wall of the spool for defining an annular gap therebetween, said cylindrical portion of the spinner head being concentric with the cylindrical wall portion of the hub, means for rotating the center shaft and the spinner head, means for selectively moving the center shaft and spinner head forwardly and rearwardly relative to the spool, a second drag washer keyed directly on the hub forwardly of the front wall of the spool for combining with the first named drag washer for applying drag pressure thereto, said second drag washer having a rearwardly projecting integral flange about the periphery thereof and positioned over and beyond the rim of the front wall of the spool, said integral flange of the second drag washer being cylindrical in shape and being concentric with the cylindrical portion of said spinner head whereby the second drag washer and concentric flange performs the dual function of applying drag pressure to the spool and, due to the concentricity between the flange on the second drag washer and the cylindrical portion of the spinner head, the line loosely disposed within the confines of the front cover as the line is being wound on or discharged from the spool will be prevented from entering the uniform gap between the flange on the spinner head and the flange on the second drag washer and retainer means for axially positioning the drag washer against the front wall of the spool.

2. A fishing reel comprising a body portion having a deck plate, a hub projecting forward of and non-rotatably fixed to said deck plate, a cover affixed to the body portion and enclosing the deck plate and the hub, a drag washer keyed to said hub, resilient means between the deck plate and the drag washer, a spool rotatably mounted on the hub for maintaining a supply of fishing line, a radially extending rear wall of the spool operatively engaging the drag washer and a front wall of the spool terminating in an outer rim, a center shaft extending axially through the hub, a spinner head carried on a forward end of the center shaft and having a cylindrical portion longitudinally overlapping the outer rim of the front wall of the spool defining an annular gap therebetween, means for rotating the center shaft, means for selectively moving the center shaft and spinner head forwardly and rearwardly relative to the spool, a second drag washer keyed directly on the hub forwardly of the front wall of the spool, the second drag washer being a unitary member including a flat friction wall portion engaging the front wall of the spool for combining with the first named drag washer for applying drag pressure thereto, said second drag washer having an integrally formed rearwardly projecting cylindrical wall portion defining a flange positioned over and beyond the rim of the front wall of the spool whereby the unitary second drag washer and flange performs the dual function of applying drag pressure to the front of the spool and preventing entanglement of the line in the gap between the spinner head and the spool, retainer means removably mounted on the hub for axially positioning the flat friction wall portion of the second drag washer against the front wall of the spool, and the second drag washer being removably mounted on the hub by the removably mounted retainer means.

* * * * *